United States Patent [19]

Satoh

[11] 3,904,975

[45] Sept. 9, 1975

[54] AUTOMATIC GAIN CONTROL CIRCUIT

[75] Inventor: Ken Satoh, Tokyo, Japan

[73] Assignee: Olympus Optical Co., Ltd., Tokyo, Japan

[22] Filed: Apr. 23, 1974

[21] Appl. No.: 463,210

[30] Foreign Application Priority Data

Apr. 26, 1973 Japan ................................ 48-50936
Aug. 22, 1973 Japan ................................ 48-98485
Aug. 24, 1973 Japan ................................ 48-99202

[52] U.S. Cl. .................. 330/29; 307/237; 307/251; 328/171; 330/145; 360/62

[51] Int. Cl.² ...................... H03G 3/30; G11B 15/02

[58] Field of Search ........... 307/237, 251, 264, 304; 328/150, 168, 169, 171, 172, 173, 175; 330/29, 145; 360/62, 67

[56] References Cited

UNITED STATES PATENTS

| | | | |
|---|---|---|---|
| 3,117,287 | 1/1964 | Damico | 330/145 X |
| 3,431,506 | 3/1969 | Hirshfield | 330/29 X |
| 3,441,748 | 4/1969 | Werner | 330/145 X |
| 3,586,989 | 6/1971 | Wheable | 307/251 X |
| 3,665,320 | 5/1972 | Ohsawa et al. | 307/251 X |
| 3,668,542 | 6/1972 | Stoffer | 330/29 X |
| 3,699,670 | 10/1972 | Takeda | 360/62 X |
| 3,705,272 | 12/1972 | Tsuji | 360/62 |
| 3,714,470 | 1/1973 | Goldberg | 307/251 X |
| 3,717,776 | 2/1973 | Sickel et al. | 307/251 X |
| 3,725,800 | 4/1973 | Papay | 330/145 X |
| 3,731,216 | 5/1973 | Nakamura et al. | 330/29 |
| 3,790,896 | 2/1974 | Shimizu et al. | 330/145 X |

*Primary Examiner*—Michael J. Lynch
*Assistant Examiner*—L. N. Anagnos
*Attorney, Agent, or Firm*—Flynn & Frishauf

[57] ABSTRACT

An automatic gain control circuit comprises a variable impedance circuit coupled to a signal source and adapted to be impedance-controlled by a feedback signal from a feedback circuit. The variable impedance circuit includes a field effect transistor having a source connected to a signal source, a drain connected through a coupling capacitor to an amplifier and a gate connected to the feedback circuit. A resistor is connected to the drain of the field effect transistor so as to be in parallel with the signal source.

10 Claims, 11 Drawing Figures

AUTOMATIC GAIN CONTROL CIRCUIT

This invention relates to an automatic gain control circuit and more particularly to an AGC circuit for use in a tape recorder.

Generally, a tape recorder has an automatic level control (ALC) circuit or automatic gain control (AGC) circuit. The circuit is adapted to hold a large magnitude input signal down to a predetermined level so that it can be recorded without distortion. In such circuit, however, the impedance sometimes reaches several hundred KΩ with respect to a large magnitude input signal. With the impedance of the AGC circuit at such a high level, a signal source impedance as seen from an amplifier side is increased. As a result, noise is increased due to the characteristic of a transistor of an amplifier. When a switch included in an electrical circuit of the tape recorder is turned ON, great noises are momentarily generated from the amplifier to cause the AGC circuit to be operated. Consequently, an input signal is attenuated to a greater extent during the initial phase of sound recording, resulting in an insufficient sound recording. On the other hand, a capacitor included in a feedback circuit of the AGC circuit repeats its charge and discharge cycle to cause the AGC circuit to be repeatedly rendered operative and inoperative and a coupling capacitor connected between the AGC circuit and the amplifier is vibratingly charged to generate intermittent noises at an output side.

It is accordingly the object of this invention to provide an AGC circuit capable of imparting a distortion-free output signal of suitable level in response to a sudden, large magnitude input signal.

SUMMARY OF THE INVENTION

According to this invention an AGC circuit includes a variable impedance circuit connected between a signal source and an output amplifier circuit and adapted to be impedance controlled by a feedback signal from the amplifier circuit. The variable impedance circuit comprises a field effect transistor and a resistor connected to the output terminal of the field effect transistor.

BRIEF DESCRIPTION OF THE DRAWINGS

This invention can be more fully understood from the following detailed description when taken in conjunction with the accompanying drawings, in which.

DETAILED DESCRIPTION OF ILLUSTRATED EMBODIMENTS

Figure 1:
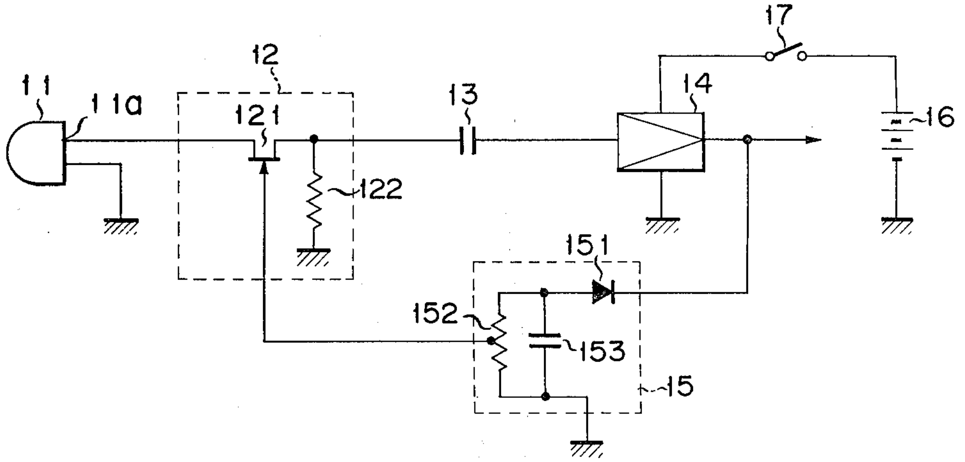
FIG. 1 shows an AGC circuit according to one embodiment of this invention.

In FIG. 1 a signal source, for example, an output terminal 11*a* of a microphone 11 is coupled to a variable impedance circuit 12 and the output of the variable impedance circuit is supplied through a capacitor 13 to an amplifier 14. The output of the amplifier 14 is supplied to a load circuit, for example, a recording magnetic head (not shown) and also supplied through a feedback circuit 15 to the variable impedance circuit 12 as a feedback signal. The amplifier 14 receives electric power from a power source 16 through a switch 17. With this embodiment the variable impedance circuit 12 comprises an N-channel field effect transistor (FET) 121 having a source connected to an output terminal 11*a* of the microphone, a drain connected to the capacitor 13 and a gate connected to the feedback circuit 15, and a resistor 122 coupling the drain of the FET to ground. The feedback circuit 15 includes a diode 151 having its cathode connected to the output of the amplifier 14 and a parallel circuit of a resistor 152 and capacitor 153, which is connected between the anode of the diode and ground. The mid-point of the resistor 152 is connected to the gate of FET 121.

According to the circuit arrangement of FIG. 1 an input signal from the microphone 11 is automatically level-controlled by the feedback signal of the feedback circuit 15. That is, the high level output signal corresponding to the high level input signal is supplied, as a negative feedback signal, through the feedback circuit 15 to the gate of FET 121 of the variable impedance circuit 12 to cause an impedance between the source and drain of the FET to be increased. As a result, the high level input signal is attenuated. In contrast, when a low level input signal is involved, the feedback signal supplied to the gate of FET 121 of the variable impedance circuit 12 is made lower in level to cause the FET to be rendered inoperative i.e., to cause the impedance of the FET to be maintained at a low value. Since in this case the input signal is not attenuated, it is passed through the FET.

Figure 2:
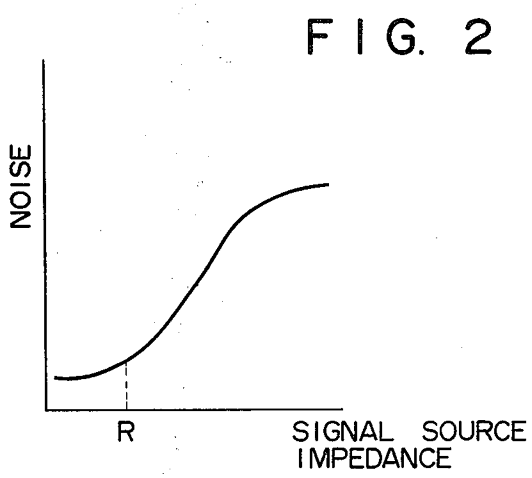
FIG. 2 is a graphical representation showing the noise characteristic of the AGC circuit.

When a large magnitude input signal is supplied to an AGC circuit using such a FET, the impedance of the FET sometimes reaches to more than several hundreds KΩ. Since according to this invention the resistor 122 is provided, a signal source impedance as seen from the amplifier 14 does not become greater than the resistance R of the resistor 122. Consequently, the increase in noise due to an increase in the impedance of the FET is held to less than a value corresponding to an R point as shown in a graph of FIG. 2 and an excellent output signal substantially free from noise is obtained. In an initial phase of operation of a device, for example, a tape recorder, having such AGC circuit the coupling capacitor 13 is charged rapidly i.e., on the order of about 1 second by an electric current through resistor 122, so that a charging vibration of the capacitor 13 as occurring for the reasons, as set out below ceases to exist. That is, the capacitor 153 of the feedback circuit 15 is charged by abrupt noises generated from the amplifier during the turn on of the switch 17. By this charging voltage the FET is rendered inoperative to increase an impedance. The capacitor 13 is slowly charged by a small magnitude input signal attenuated by the increased impedance of the FET. Before a complete charging of the capacitor 13 is effected, the capacitor 153 of the feedback circuit is discharged to cause the FET to be rendered inoperative to permit a large magnitude input signal to be passed through the FET. For this reason, the capacitor 153 is recharged to render the FET operative. Such an operation is repeated until the capacitor 13 is completely charged, and vibration occurs at the charge of the capacitor 13. The vibration appears as intermittent noises. According to this invention, however, the vibration can be completely eliminated since the resistor 122 is inserted in the AGC circuit. Furthermore, since the capacitor 13 is rapidly charged, it is not necessary to charge the capacitor 13 by an input signal involved during the initial phase of operation. For this reason, no insufficient sound recording occurs even during the initial phase of recording.

Figure 3:
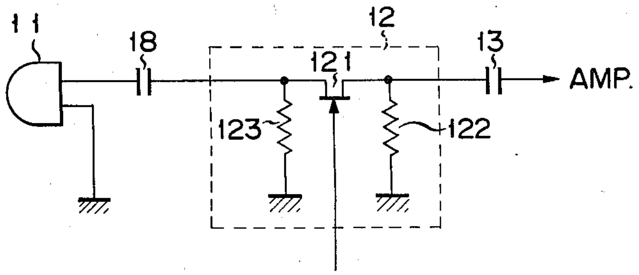
FIG. 3 shows a modified variable impedance circuit of the AGC circuit.

FIG. 3 shows a variable impedance circuit of an AGC circuit when a capacitor type microphone requiring a DC bias power source is used. In this case, a coupling capacitor 18 is connected between a microphone 11 and the variable impedance circuit 12. To create a charging circuit of the capacitor 18, a resistor 123 is connected between FET 121 and ground. Even if the FET is rendered operative to have a high impedance, the capacitor 18 is rapidly charged through resistor 123 and no insufficient sound recording etc. take place during the initial phase of sound recording.

Figure 4:
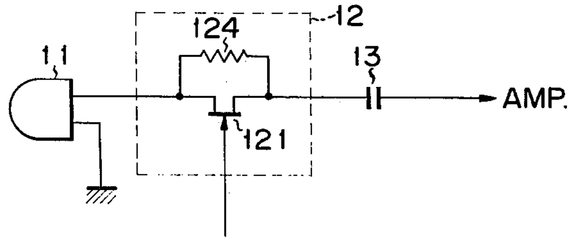
FIG. 4 is a variable impedance circuit according to another embodiment of this invention.
Figure 5:
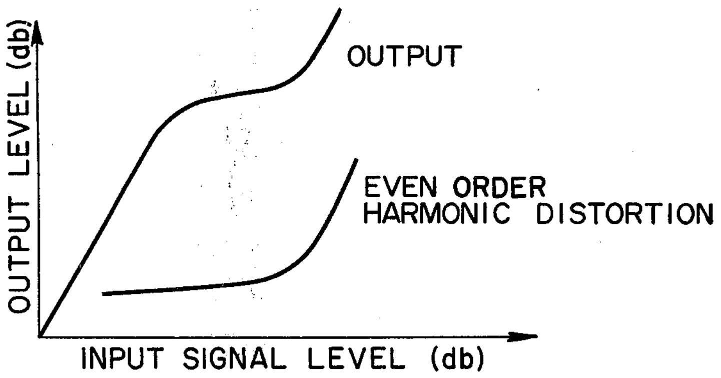
FIG. 5 shows the characteristic curve of even order harmonic distortion of a field effect transistor.

FIG. 4 shows an embodiment in which a resistor 124 is connected between the source and drain of an FET of a variable impedance circuit. With this embodiment the same effect as in the circuit of FIG. 1 is obtained. That is, a large increase in the impedance of the FET is compensated and a charging circuit of the capacitor 13 is created. Furthermore, it is possible in this embodiment to decrease the occurrence of an even order harmonic distortion as involved due to the characteristics of the FET when a greater automatic gain control (AGC) is applied. With the AGC circuit using an FET an increase of an output and even order harmonic distortion as contrasted with an increase of an input has such a relation as shown in a graph of FIG. 5. As will be understood from this graph, when AGC is excessively applied i.e., the impedance of the FET becomes greater than a certain value, the even order distortion will be rapidly increased. If, from this view point, the value of the resistor 124 is so selected as to be made equal to an FET impedance value obtained immediately before a point at which the distortion is rapidly increased, an output signal substantially free from such distortion is obtained from the AGC circuit.

Figure 6:
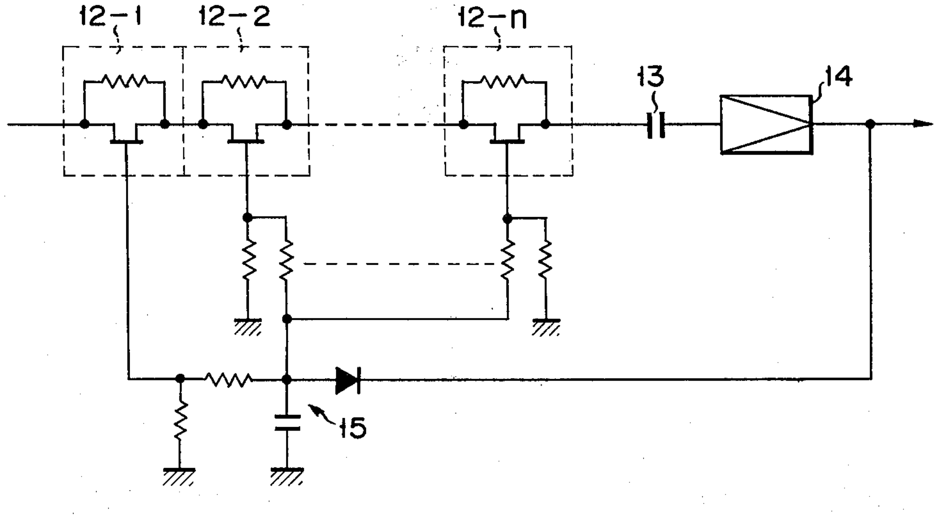
FIG. 6 shows a modified AGC circuit including a plurality of variable impedance circuits.
Figure 7:
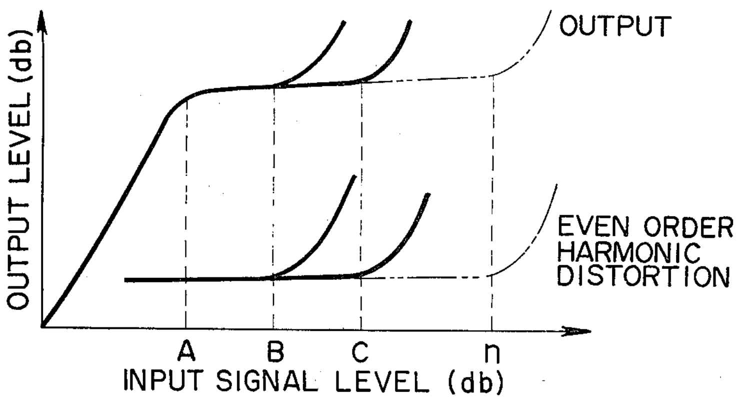
FIG. 7 shows the characteristic curve of the AGC circuit of FIG. 6.

FIG. 6 shows an AGC circuit in which a plurality of variable impedance circuits are connected in series configuration. This AGC circuit permits an AGC application range to be extended with the even order harmonic distortion decreased. A first FET circuit 12-1 is so set that an automatic gain control as defined between A and B in FIG. 7 is allotted and a second FET circuit 12-2 is so set that an automatic gain control as defined between B and C in FIG. 7 is allotted. In this way, if the allotting range of AGC is so set up to an nth FET circuit, an automatic gain control can be carried out over a wider range without involving any distortion. The allotting range of AGC of each FET can be determined, for example, as follows:

1. A bias voltage applied to the gate of each FET is so set as to correspond to a respective predetermined value.
2. The resistance of the resistor 124 of each FET circuit is so set as to correspond to a respective predetermined value.
3. Each FET is selected to have a different predetermined characteristic.

Figure 8:
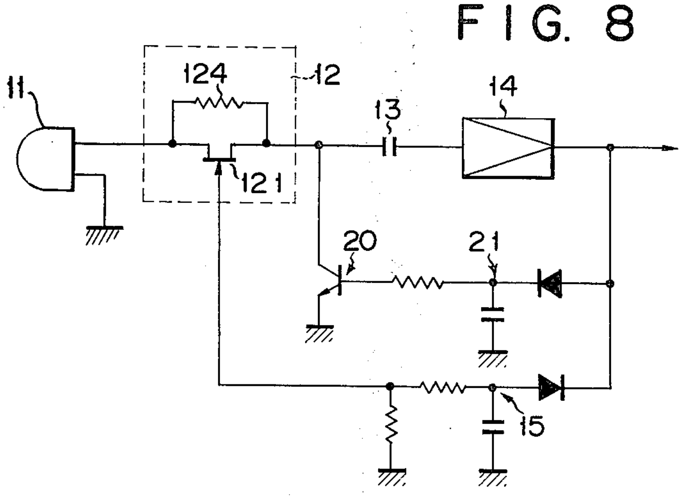
FIG. 8 shows another AGC circuit including an additional variable impedance circuit.
Figure 9:
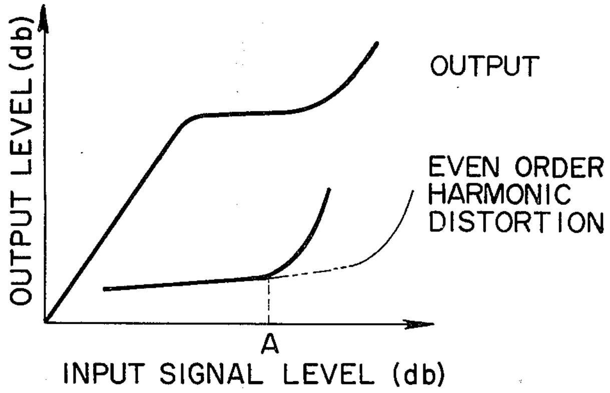
FIG. 9 shows the characteristic curve of the AGC circuit of FIG. 8.

FIG. 8 shows an embodiment in which, in addition to the variable impedance circuit 12 of FIG. 4, another variable impedance circuit 20 is connected in parallel with a signal source. The additional variable impedance circuit 20 includes an npn transistor having a collector connected to the drain of FET 121 and a grounded emitter. The base of the additional variable impedance circuit 20 is coupled through a feedback circuit 21 to an amplifier 14. With a circuit shown in FIG. 8 the variable impedance circuit 12 performs an automatic gain control over a range up to a point A as shown in a graph of FIG. 9, while the additional variable impedance circuit 20 performs an automatic gain control over a range beyond the point A. With the embodiment of FIG. 8 feedback circuits 15 and 21 are provided independently of the two variable impedance circuits 12 and 20.

Figure 10:
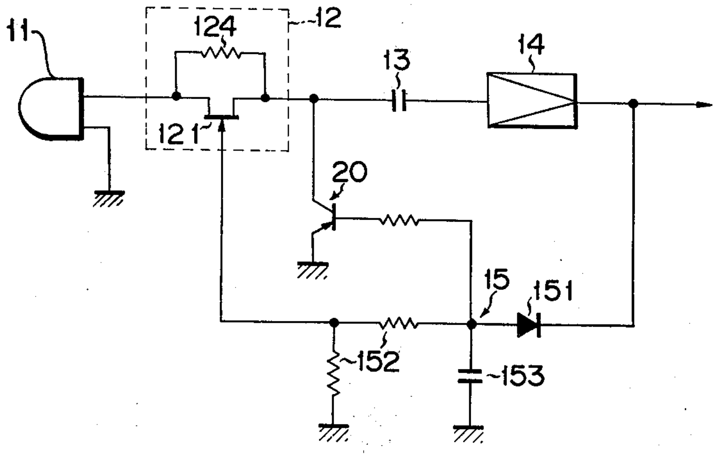
FIG. 10 shows another AGC circuit.

FIG. 10 shows an embodiment capable of controlling both the variable impedance circuits 12 and 20 by the single feedback circuit 15. In this embodiment a pnp transistor is used as a transistor for the additional variable impedance circuit 20. This permits a bias voltage of the same polarity to be applied to both the variable impedance circuits 12 and 20. Consequently, both the variable impedance circuits can be operated by the single feedback circuit. Though with this embodiment the transistor for the variable impedance circuit 20 is exchanged for a transistor of the other junction type, a p-channel FET may be used in place of the n-channel FET of the variable impedance circuit 12. In this case it is required that a diode 151 of the feedback circuit 15 be reversely connected.

Figure 11:
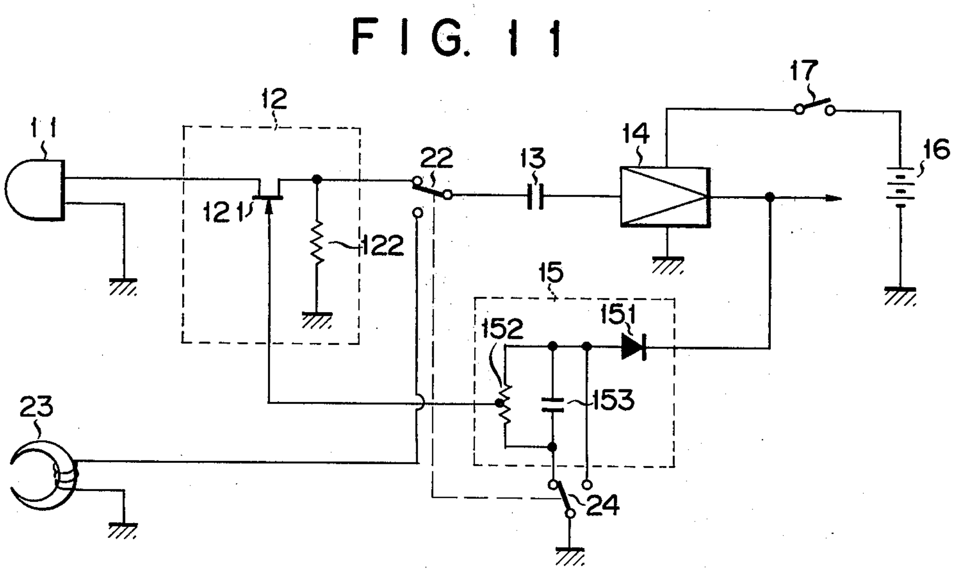
FIG. 11 shows a circuit arrangement of a tape recorder using the AGC circuit of FIG. 1.

FIG. 11 shows an embodiment in which the AGC circuit of FIG. 1 is applied to a tape recorder. In this embodiment a recording and reproducing change-over switch 22 is connected between a variable impedance circuit 12 and a capacitor 13. During the recording time the variable impedance circuit 12 is connected to an input circuit of the tape recorder and an input signal from a microphone is automatically level-controlled. During the reproducing time a reproducing signal from a reproducing head 23 is supplied, not through variable impedance circuit 12, to an amplifier. With a conventional tape recorder such a recording and reproducing change-over switch is provided between a variable impedance circuit and a microphone. For this reason, a switch for cutting off an AGC circuit is additionally provided so that no automatic gain control is applied. In the embodiment of FIG. 11 the single change-over switch 22 is employed. During the reproducing time the AGC circuit is substantially separated from a tape recorder circuit. In the embodiment of FIG. 11, when, during the application of a high level reproducing signal to the input circuit of the tape recorder circuit, the change-over switch 22 is switched from the reproducing side to the recording side, a capacitor 153 of a feedback circuit 15 is charged by a high level feedback signal current to cause the FET to be rendered operative to permit the impedance of the FET to be increased. As a result, a recording input signal is attenuated to a greater extent. For this reason, it is impossible to record a low sound during the initial phase of recording or a distant sound. To obviate this drawback, a change-over switch 24 ganged with the recording and reproducing switch 22 is provided in the feedback circuit 15. The switch 24 permits the negative terminal of the capacitor 153 to be grounded during the recording time and the positive terminal of the capacitor 153 to be grounded during the reproducing time. During the reproducing time, therefore, the capacitor 153 is not entirely charged. As a result, the FET is not rendered operative when the recording and reproducing switch 22 is switched from the reproducing side to the recording side. Even if the capacitor 153 is reversely charged due to some causes, it is immediately discharged when the recording and reproducing switch is switched to the recording side.

According to this invention there is obtained, with a simple circuit arrangement, a tape recorder having excellent recording and reproducing characteristics.

It is to be noted that with the embodiments shown in FIGS. 4, 6, 8 and 10 the resistor 122 may be connected to the drain of the FET so as to be in parallel with the signal source.

What is claimed is:

1. An automatic gain control circuit comprising:

a field effect transistor connected between the output of a signal source and the input of an output amplifier circuit;

a feedback circuit means coupling an output terminal of said amplifier to a control terminal of said field effect transistor, the impedance of said field effect transistor being varied as a function of a feedback signal via said feedback circuit means from said output terminal of said amplifier circuit; and a resistor circuit connected to said field effect transistor in parallel with the signal source;

said automatic gain control circuit having a noise characteristic curve which is a function of the signal source impedance thereof, said noise characteristic curve having a knee point corresponding to a given signal source impedance at which knee point the noise level begins to rapidly rise, said resistor circuit including a resistor having a resistance less than that of the signal source impedance corresponding to said knee point of said noise characteristic curve.

2. An automatic gain control circuit according to claim 1 in which said resistor of said resistor circuit is connected to the output terminal of said field effect transistor.

3. An automatic gain control circuit according to claim 2 wherein said resistor circuit further includes an input resistor connected to the input terminal of said field effect transistor.

4. An automatic gain control circuit comprising:

a field effect transistor connected between the output of a signal source and the input of an output amplifier circuit, said field effect transistor being further coupled to an output terminal of said amplifier, the impedance of said field effect transistor being varied as a function of a feedback signal from said output terminal of said amplifier circuit; and at least one resistor connected between the input and output terminals of said field effect transistor;

said automatic gain control circuit having an even order harmonic distortion characteristic curve which is a function of the impedance of said field effect transistor, said even order harmonic distortion characteristic having a knee point corresponding to a given field effect transistor impedance at which knee point the even order harmonic distortion begins to rapidly rise, said at least one resistor having a resistance substantially equal to the impedance of the field effect transistor obtained just before said knee point of said even order harmonic distortion characteristic curve.

5. An automatic gain control circuit comprising:

a plurality of field effect transistors sequentially and serially connected between the output of a signal source and the input of an output amplifier circuit;

a feedback bias circuit coupling said field effect transistors to an output terminal of said amplifier for supplying respective feedback signals to the respective field effect transistors, the impedances of said field effect transistors being varied as a function of said respective feedback signals; and a plurality of resistors connected between the source and drain of the respective field effect transistors;

said automatic gain control circuit having an even order harmonic distortion characteristic curve which is a function of the impedances of said field effect transistors, said even order harmonic distortion characteristic curve having a knee point corresponding to a given field effect transistor impedance at which knee point the even order harmonic distortion begins to rapidly rise, each of said plurality of resistors having a resistance substantially equal to the impedance of the field effect transistor obtained just before said knee point of said even order harmonic distortion characteristic curve.

6. An automatic gain control circuit comprising:

a first variable impedance circuit including a field effect transistor connected between the output of a signal source and the input of an output amplifier circuit, said field effect transistor having input, output and control electrodes;

a resistor connected between the input and output terminals of said field effect transistor;

a first feedback circuit coupled between the control electrode of said field effect transistor and an output of said amplifier circuit for supplying a feedback signal to said control electrode of said field effect transistor to control the impedance of said field effect transistor;

a second variable impedance circuit including a bipolar transistor connected to the output terminal of said field effect transistor and in parallel with the signal source, said bipolar transistor having a control electrode; and a second feedback circuit connected between said control electrode of said bipolar transistor and an output amplifier circuit for supplying a feedback signal to said control electrode of said bipolar transistor.

7. An automatic gain control circuit according to claim 6 in which: said field effect transistor of said first variable impedance circuit is an n-channel field effect transistor the gate of which is connected to said first feedback circuit; said first feedback circuit comprises a negative feedback circuit supplying a negative feedback signal to said gate of said field effect transistor;

said bipolar transistor of said second variable impedance circuit is an npn transistor the base of which is connected to said second feedback circuit; and said second feedback circuit comprises a positive feedback circuit supplying a positive feedback signal to said base of said bipolar transistor.

8. An automatic gain control circuit according to claim 6 in which: said transistor of said first variable impedance circuit is an n-channel field effect transistor; said first feedback circuit comprises a negative feedback circuit for supplying a negative feedback signal to the gate of said field effect transistor; said transistor of said second variable impedance circuit is a pnp transistor; and said second feedback circuit comprises means coupled to said negative feedback circuit for supplying a negative feedback signal from said negative feedback circuit to the gate of said pnp transistor.

9. An automatic gain control circuit comprising:

a field effect transistor connected between the output of a signal source and the input of an output amplifier circuit, said field effect transistor being further coupled to an output terminal of said amplifier, the impedance of said field effect transistor being varied as a function of a feedback signal from said output terminal of said amplifier circuit; and a resistor circuit connected to said field effect transistor in parallel with the signal source;

said automatic gain control circuit having a noise characteristic curve which is a function of the signal source impedance on the signal source side as seen from the amplifier circuit side, said noise characteristic curve having a knee point corresponding to a given signal source impedance, as seen from the amplifier circuit side, at which knee point the noise level begins to rapidly increase;

said resistor circuit including a resistor having a resistance substantially equal to the impedance on the signal source side as seen from the amplifier circuit side corresponding to a point just before said knee point of said noise characteristic curve.

10. An automatic gain control circuit comprising:

a recording and reproducing change-over switch for alternatively supplying an output of a recording signal source and an output of a reproducing source to an input of an output amplifier circuit;

a variable impedance circuit including a field effect transistor connected between said change-over switch and the recording signal source and a resistor connected to the output terminal of said field effect transistor;

a feedback circuit connected between the gate of said field effect transistor and an output of said amplifier circuit to supply a feedback signal to the gate of said field effect transistor, said feedback circuit comprising a rectifying element having one terminal connected to the output of said amplifier circuit, smoothing capacitor having one terminal thereof connected to the other terminal of said rectifying element and a smoothing resistor connected in parallel to said smoothing capacitor and having a neutral point connected to the gate of said field effect transistor; and a ground switch interlocked with said change-over switch to alternatively ground the two terminals of said smoothing capacitor.

* * * * *